Sept. 29, 1964

A. FRANCK ETAL 3,151,234

BINARY COUNTER

Filed Jan. 13, 1960

INVENTORS
ABRAHAM FRANCK
GEORGE F. MARETTE
BERC I. PARSEGYAN

BY Cushman, Darby & Cushman
ATTORNEYS 3,151,234
BINARY COUNTER
Abraham Franck and George F. Marette, Minneapolis, and Berc I. Parsegyan, St. Paul, Minn., assignors to Sperry Rand Corporation, New York, N.Y., a corporation of Delaware
Filed Jan. 13, 1960, Ser. No. 2,196
3 Claims. (Cl. 235—92)

The present invention relates generally to electronic devices suitable for use in digital data handling equipment and more specifically to a binary counting device utilizing the saturable transformer properties of certain magnetic materials to provide a device yielding toggle type inputs to each stage of the count register.

Briefly, the present invention comprises a count register consisting of a plurality of bistable circuits, suitably interconnected by saturable transformer devices so as to provide a parallel input to all stages of the count register. In its simplest form the counting circuit is comprised of a plurality of saturable transformer devices, there being one device for each stage of the count register. These devices have windings associated therewith such that the information or count contained in the count register stages supplies a biasing field on these devices. This biasing field serves to enable the transformer devices and hence allows the pulses to be counted, which may be termed drive pulses, to be transmitted to the next higher order stage of the count register. If the count contained in a register stage is such that no bias is applied to its associated device these drive pulses are prevented from propagating on to the next higher order stage. With this arrangement functioning as an increasing counter, the drive pulses are propagated until they reach the saturable transformer device associated with the lowest order stage of the count register containing a binary "0." This lower order "0" bit is then changed to a "1" and all lower order "1" bits are toggled to "0." Similiarly, when operated as a decreasing counter, the core gates are biased such that the drive pulses propagate therethrough until they reach the saturable transformer device associated with the lowest order "1" bit in the count register. This bit is changed to a "0" and all lower order "0" bits are toggled to their "1" state.

The principal objects of this invention are:

To provide a novel parallel-gated binary counting circuit having extremely low power requirements and very high counting rates.

To provide a novel magnetic gating circuit for interconnecting a plurality of signal propagating and blocking devices so as to form a counter.

To provide a counter employing a plurality of bistable devices which may be operated optionally in an increasing or decreasing mode.

Other objects and advantages of this invention will become obvious to those having ordinary skill in the art by reference to the following detailed description of exemplary embodiments of the apparatus, and to the appended claims. The various features of the exemplary embodiments may best be understood with reference to the following drawings, wherein:

Figure 1:
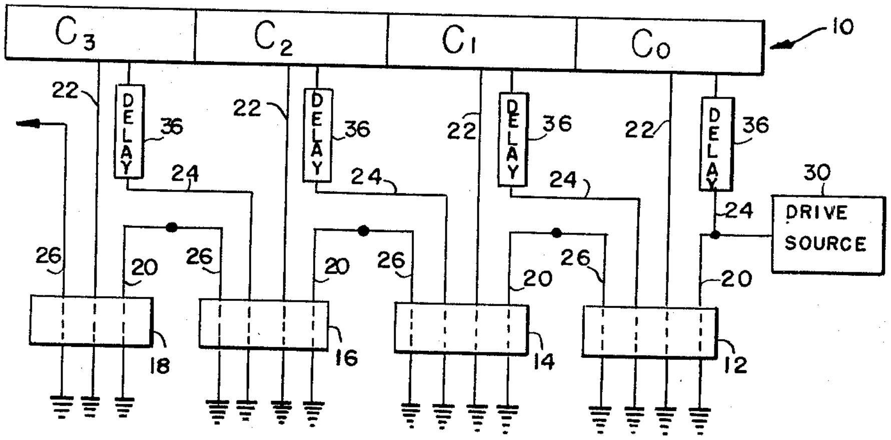
FIGURE 1 is an exemplary 4-stage counter according to the teachings of this invention.

Reference will now be made to FIGURE 1 wherein the combination block schematic diagram of a preferred embodiment of the invention is presented. There are four stages $C_0$, $C_1$, $C_2$, and $C_3$ of a binary count register 10, each stage of which may be a bistable multivibrator or flip-flop. It is understood that register 10 is a plural stage register having in general $n$ stages, where $n$ is any integer, four stages being used by way of example. With the apparatus shown, the counter of FIGURE 1 is capable of counting to a value of $2^4-1$ or decimal 15. It is of course possible to increase the modulus of the counter to a value $2^n-1$ by merely adding additional identical stages. It is not intended, therefore, that the invention be limited to the exact configuration shown, since it is well within the limits of ordinary skill in the art to alter the size of the counter without departing from the scope of the invention. Many forms of bistable multivibrators are relatively well known in the art, and hence it is felt that a detailed description of an exemplary flip-flop is unnecessary. However, since in the preferred embodiment of this invention the saturable transformer devices are thin deposited ferromagnetic elements which are operated in a saturable transformer mode, i.e., operated along their difficult axis in accordance with the teachings of the copending application of W. W. Davis et al., Serial No. 855,206, filed November 24, 1959, it is desirable that the flip-flops comprising the count register 10 be capable of operating at high switching rates.

Associated wtih each count register stage $C_0$ through $C_3$ is one of a plurality of magnetic devices or elements, numbered (using only even numbers) 12 through 18 respectively. These elements form the core members of saturable transformers. As mentioned above, the preferred form of these core members is a thin ferromagnetic film, such as the type prepared according to the Rubens Patent No. 2,900,282. These films exhibit uniaxial anisotropy, i.e., the film have a single easy axis and a single difficult axis of magnetization, in the plane of the film. However, we do not intend to limit the invention to devices prepared in this manner, since the devices utilized may take many other forms such as a toroidal configuration, a bar of material, etc.

Associated with each core 12 through 18 are four windings, namely an input winding 20, a bias or control winding 22, a toggle or output winding 24, and an output winding 26. The output winding 26 of a device coupled to a lower-order stage is coupled to the input winding 20 of a device coupled to the next succeeding higher-order such that if the magnetization of the device or core of the lower-order stage is driven into its high permeability region of its characteristics, a signal will be induced in the output winding 26 of that core which serves as an input driving signal to the next higher-order stage. Provided that all cores are properly biased such that an input signal can induce an output signal, the input signal to the lowest-order core 12 may be, in effect, propagated down the line to the highest order core 18.

Figure 2:
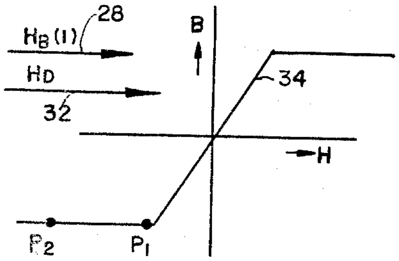
FIGURE 2 illustrates the magnetic characteristics of the core gates and direction of applied fields for increasing counter operation.

One of the important features of this invention resides in the fact that the information or number contained in count register 10 controls the state of the saturable transformer device coupled thereto. Referring to FIGURE 2 wherein an idealized hysteresis loop of a thin film core prepared according to the above-mentioned Rubens patent and operated along its difficult axis is shown, if the counter is to function in an increasing mode, the cores 12 through 18 are initially biased (by means not shown) such that when the count register is cleared, all cores are magnetized to their $P_2$ state. Now if a binary "1" is entered into a particular count register stage, a current is made to flow through its associated bias or control winding 22 which produces a field $H_B$ (1) in the core indicated by vector 28) tending to shift the magnetization of this core from its $P_2$ state to its $P_1$ state. Since in a flip-flop, the two stable states are generally identified by two well-defined levels of potential, the bias or control lines 22 may be connected directly to the "one" output terminal of the count register flip-flops such that the potential present at this point may be used to produce the required bias current.

The toggle lines 24 are arranged such that, if the combined effect of the bias field and the input drive field is sufficient to drive the magnetization of a given core into its high permeability region, the resulting voltage impulse induced in its associated toggle line may be applied through a suitable delay to the toggle input terminal of the next higher-order count register flip-flop stage. The effect of this toggle pulse is to always shift or change the information content of the stage to which it is applied. For example, if a flip-flop is in its arbitrarily defined "1" state, the toggle pulse will cause the flip-flop to assume its "0" state and vice versa. The delay is required to prevent a premature shift in the bias level of the magnetic cores until the count is complete. The necessity of these delays will become more apparent from the following operational description.

To aid in the further explanation of the operation of the circuit of FIGURE 1, it may be well to consider a few examples of the counting operation both when the circuit is functioning as an increasing and as a decreasing counter. As a first example, assume that the counter has already been advanced to decimal 11 such that the binary number 1011 is presently stored in the count register 10, with the highest order digit in stage $C_3$ and the lowest order digit in stage $C_0$. Under this condition, current will flow through the control lines 22 associated with stages $C_0$, $C_1$ and $C_3$ whereas no current flows through the control line associated with stage $C_2$. The current flow through these control lines causes the magnetization of cores 12, 14, and 18 to shift from the $P_2$ state to the $P_1$ state. Core 16, of course, remains in its $P_2$ state. When the next count advance pulse is emitted from current pulse driver 30 to input winding 20 on core 12, a field $H_D$ indicated by vector 32 in FIGURE 2 causes the magnetization of this core to undergo an excursion into its high-permeability region 34 of its characteristic, and hence a signal is induced in toggle line 24 and in output line 26 magnetically associated therewith.

Because of the fixed delay elements 36, the output signal induced in line 26 of core 12 is applied as an input pulse to line 20 of film 14 before the toggle pulses on lines 24 is available at the toggle input terminals of stages $C_0$ and $C_1$ to reverse the information contained therein.

Since core 14 is in its $P_1$ state and the input pulse on line 20 of core 14 establishes the drive field $H_D$ for this core, the magnetization of this core is also shifted to its high permeability region. As before, signals are therefore induced in toggle line 24 and output line 26 of core 14. The output signal produced by the switching of core 14 serves as an input drive pulse for core 16. However, since core 16 is in its $P_2$ state, the effect of the input pulse applied thereto is insufficient to shift the magnetization of core 16 beyond the knee of its hysteresis curve. As a result, no signal is induced in toggle line 24 or output line 26 of core 16.

By staggering the value of delay of each of the elements 36 a predetermined amount, it is possible to have the toggle pulses arrive at the toggle input terminals of count register stages $C_0$, $C_1$ and $C_2$ simultaneously, after sufficient time has been allowed for the drive pulse to propagate down the line. It can be seen that after the toggle pulses have been applied to the count register flip-flops, the binary number contained in the register will be 1100 (decimal 12) and the count has been advanced by one.

The next count advance pulse merely toggles stage $C_0$, since previous to the arrival of this toggle pulse stage $C_0$ contains a "0" and hence core 12 is in its $P_2$ state and cannot be switched by the input pulse. The count contained in register 10 is then 1101 (decimal 13).

It will be observed that core 18 is not vital to the operation of a four bit counter. However, by including this core a convenient means is obtained for indicating to an external indicator that the modulus of the counter has been exceeded.

For a decreasing counter all cores are initially biased to their $P_2$ state, as for the increasing counter. This time a "0" in any stage of the count register biases the associated core to point $P_1$, by having the lines 22 connected to the register stages to carry current when these stages are in a "0" state. The drive pulse then has the same action as in the increasing counter, i.e., continuing to be propagated through the film elements until a film in its $P_2$ state (a "1" in the count register) is reached. The lowest order stage is again toggled after a short delay each time the count is to be decreased.

As an example, assume that the binary number 0101 (decimal 5) is contained in register 10, i.e., $C_3$ contains a "0," $C_2$ contains a "1," $C_1$ contains a "0" and $C_0$ contains a "1." The saturable transformer devices 12–18 are as before biased to the $P_2$ state. The bias current from control lines 22 produces a field $H_B(0)$ in FIGURE 3 which causes films 18 and 14 to assume the $P_1$ state. Films 16 and 12 respectively remain in their $P_2$ state since the register stages thereto coupled both contain a "1." When the next count advance pulse is emitted from signal source 30, it provides a signal to the delay element 36 coupled to $C_0$ and produces a current in the input line 20 of core 12. This current produces a field $H_D$ which moves the magnetization of film element 12 to $P_1$. As a result no signal is induced on the toggle line 24 or output line 26 of core 12. Thus cores 14, 16 and 18 receive no input pulse on their respective input lines and therefore the count register stages $C_3$, $C_2$ and $C_1$ remain in their original states. The signal on the delay element 36 of core 20 reaches stage $C_0$ after the predetermined delay has elapsed; reaches the toggle input thereof causing the flip-flop of stage $C_0$ to change states. Thus the word 0100 (decimal 4), which is the correct result, is now stored in the register.

Figure 3:
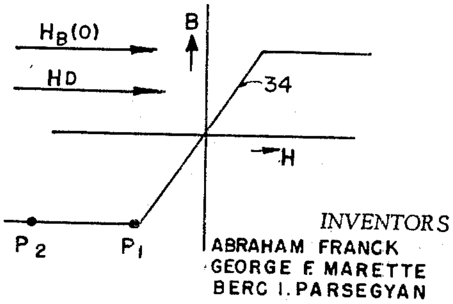
FIGURE 3 illustrates the magnetic states of the core gates and directions of applied fields for decreasing counter operation.

To see how an operation which exceeds the modulus of register 10 is handled assume that the binary number 0000 (decimal "0") is cotnained in register 10, and a decreasing operation is desired. As illustrated in FIGURE 3 all cores will be shifted from the $P_2$ state to the $P_1$ state under these circumstances. When the next pulse from driver 30 is applied to the magnetic gating circuit, it will be propagated down the line and ultimately produce an output signal on output line 26 of core 18. Likewise, a toggle pulse will be induced in winding 24 of all cores and hence, after a suitable delay, will arrive simultaneously at the toggle input terminals of stages $C_0$ through $C_3$ inclusive. The new count will then be 1111 (decimal 15), the output on line 26 of core 18 indicating that the modulus of the counter has been exceeded.

Because of the attenuation characteristics of saturable transformer elements, it may be necessary to insert signal amplifying means periodically between the output winding of one core and the input winding of the next core, to insure that the drive signal is properly propagated.

Thus it can be seen that there is provided by this invention a circuit whereby the various objects and advantages can be successfully achieved. Other modifications of this invention may become apparent to those of ordinary skill in the art after having received the benefit of this disclosure. It is therefore intended that the foregoing be construed as illustrative and not limitative, the scope of the invention being defined in the claims.

What is claimed is:

1. For use in a binary counter, in combination: a bistable stage including output means for developing signal manifestations of its state; a saturable transformer normally biased to a first relatively high degree of saturation; said transformer including a magnetic thin-film core having easy and hard axes of magnetization with magnetic remanence being substantially along the easy axis; control winding means connected to said stage output means and inductively coupled to the saturable transformer for biasing the latter from said first degree of saturation to a lesser degree of saturation only if the bistable stage is in a first state; input winding means adapted to receive a signal and inductively coupled to the saturable transformer for causing the latter to shift substantially out of the saturation state in response to a received signal only if the saturable transformer is biased to said lesser degree of saturation; said saturable transformer returning to saturation upon termination of the signal received by said input winding means; output winding means inductively coupled to said saturable transformer for producing an output signal when said saturable transformer shifts in response to a signal received by the input winding means; and all the winding means being magnetically linked to the hard magnetization axis and the magnetic remanence remaining aligned with the easy axis during operation of the transformer.

2. For use in a binary counter, in combination: a bistable stage including output means for developing a signal manifestation of its state; a thin film ferromagnetic device having easy and hard magnetization axes and being characterized by its saturable transformer mode of operation and normally biased to a relatively high degree in one level of saturation even with substantially all magnetic remanence being along the easy axis at all times; all windings being magnetically linked to the hard axis for cooperating with the device for forming a transformer action having small hysteresis loss by providing a saturation flux density at small magnetic field strengths; control winding means connected to said stage output means and inductively coupled to said device for biasing the latter to a lesser degree in said one saturation level only if the bistable stage is in a first stable state; input winding means adapted to receive a signal and inductively coupled to said device for causing the latter to shift substantially out of said one saturation level in response to a received signal only if said device is biased to said lesser degree; said device returning to said one saturation level upon termination of the signal received by said input winding means; and output winding means inductively coupled to said device for producing an output signal when said device shifts out of saturation in response to a signal received by the input winding means.

3. Counting apparatus, comprising: a register of plural bistable stages, each stage representing a different digit order and including input means for receiving signals for changing the state of the stage and output means for providing signal manifestations of the state of the stage; a saturable transformer device including a thin magnetic film core having easy and hard magnetization axes with magnetic remanence being substantially along the easy axis and all windings herein being magnetically linked to the hard axis such that electrical signals therein have magnetic fields affecting only the dynamic magnetization along the hard axis for each bistable stage normally biased to a relatively high degree in one level of saturation; control winding means connected to each stage output means and inductively coupled to the respectively corresponding saturable transformer device for biasing the latter to a lesser degree of saturation in said one level if the corresponding bistable stage is in a first stable state; input winding means for each of said devices adapted to receive a signal and inductively coupled to a respective device for causing the device to shift substantially out of saturation in response to a received signal only if the device is biased to said lesser degree; the device returning to said one level of saturation upon termination of a received signal; output winding means for each device inductively coupled to a respective device for producing a signal when the corresponding device shifts out of saturation in response to a signal received by the input winding means; a source of signals to be counted; means for coupling the signals from said source to the input winding means of the device associated with the lowest digit order stage and for delay coupling said signals to the input means of said lowest digit order stage; means coupling the output winding means of each device to the input winding means of the device associated with the next higher digit order stage; and delay means further coupling the output winding means of each device to the input means of the next higher digit order stage.

References Cited in the file of this patent

UNITED STATES PATENTS

| | | |
|---|---|---|
| 2,536,917 | Dickinson | Jan. 2, 1951 |
| 2,735,005 | Steele | Feb. 14, 1956 |
| 2,819,395 | Jones | Jan. 7, 1958 |
| 2,844,812 | Auerbach | July 22, 1958 |
| 2,846,669 | McMillan | Aug. 5, 1958 |
| 3,014,656 | O'Brien | Dec. 26, 1961 |
| 3,023,402 | Bittman | Feb. 27, 1962 |

FOREIGN PATENTS

| | | |
|---|---|---|
| 721,669 | Great Britain | Jan. 12, 1955 |
| 871,829 | Great Britain | July 5, 1961 |

OTHER REFERENCES

"Arithmetic Operations in Digital Computers," by Richards, published by D. Van Nostrand Co., Inc., N.Y., Chapter 7, pp. 193–208 relied on.

"A Formal Procedure for the Logical Design of an Optimum Binary Counter," by Cohen, from the Proc. of the Nat'l Electronics Conf., 1954, pp. 523 to 532.

"A Compact Coincident-Current Memory," A. V. Pohn, S. M. Ruberes, Proceedings of Eastern Joint Computer Conference, Dec. 10–12, 1956.